United States Patent [19]
Furukawa et al.

[11] Patent Number: 5,147,658
[45] Date of Patent: Sep. 15, 1992

[54] APPARATUS FOR CONTINUOUS MANUFACTURING OF INJECTION MOLDED ARTICLES

[75] Inventors: Yasuhiro Furukawa; Kihei Takahashi, both of Toyama, Japan

[73] Assignee: Yoshida Kogyo K. K., Tokyo, Japan

[21] Appl. No.: 694,071

[22] Filed: May 1, 1991

Related U.S. Application Data

[62] Division of Ser. No. 510,855, Apr. 18, 1990, abandoned.

[30] Foreign Application Priority Data

Apr. 20, 1989 [JP] Japan ............................ 1-101394

[51] Int. Cl.⁵ ........................................... B29C 45/40
[52] U.S. Cl. ................................... 425/127; 264/153; 264/157; 264/161; 264/250; 264/255; 264/297.2; 264/328.8; 425/129.1; 425/556
[58] Field of Search ............. 264/153, 157, 161, 250, 264/255, 297.2, 328.8; 425/110, 116, 127, 814, 129.1, 554, 556; 164/113, 303

[56] References Cited

U.S. PATENT DOCUMENTS

| | | | |
|---|---|---|---|
| 2,686,338 | 8/1954 | Morin | 425/814 |
| 4,226,577 | 10/1980 | Sawada | 425/814 |
| 4,434,923 | 3/1984 | Nagata et al. | 264/161 |
| 4,440,702 | 4/1984 | Susnjara | 425/437 |

*Primary Examiner*—Tim Heitbrink
*Attorney, Agent, or Firm*—Hill, Van Santen, Steadman & Simpson

[57] ABSTRACT

A runner-strip and articles attached to the runner-strip are molded into a piece in an injection molding unit. The piece is pulled out of the injection molding unit by a pulling-out unit. A back end of the runner-strip is left in the injection molding unit and is continued to a subsequent runner-strip to form a series of the pieces. The articles are separated from the runner-strip by providing a shock to both sides of the articles. Collecting units are provided for collecting the articles and the runner-strip.

6 Claims, 6 Drawing Sheets

5,147,658

APPARATUS FOR CONTINUOUS MANUFACTURING OF INJECTION MOLDED ARTICLES

This is a divisional application of U.S. Ser. No. 510,855, filed Apr. 18, 1990, now abandoned.

BACKGROUND OF THE INVENTION

1. Field of the Invention

This invention relates to a method of automatic and continuous manufacturing of injection molded desired articles from molten material, injected into molds, such as synthetic resin, aluminum alloy, zinc alloy, other metal and the like, and relates to an apparatus of the method.

2. Prior Art

As shown in U.S. Pat. No. 4,434,923, a conventional method of manufacturing of comparatively small articles made from material, such as synthetic resin by plastic injection molding or metal by die cast molding, generally has the following steps. A number of articles are molded at the same time in male and female molds so as to be attached to a runner-strip molded in a runner. In this case, a molded piece containing the runner-strip and the articles attached to the runner-strip is separately molded from proceeding and subsequent pieces. Then, the molded articles are introduced into a separately provided separating apparatus so that the articles are detached from the runner-strip.

With the conventional manufacturing method of this kind, an injection molding apparatus and a separating apparatus are provided separately. This results in a low efficiency of productivity requiring excess labor costs.

SUMMARY OF THE INVENTION

Accordingly, an object of the present invention is to provide a method and an apparatus of continuous manufacturing of injection molded articles facilitating efficient productivity by permitting articles, which are molded by one-shot of injection and which are attached to a runner-strip having a sprue molded in a runner, to be fed and to be separated from the runner-strip automatically.

This object is realized by the method and apparatus of the present invention.

According to the present invention, a runner-strip and articles attached to the runner-strip, which are molded from molten material injected into molds, are fed out of the molds. Then, the back end of the runner-strip with the articles is continued to the front end of a subsequent runner-strip with the articles molded similarly so that the runner-strip is continued as a series. When the series of the molded runner-strip with the articles are pulled out by a pulling-out unit and are fed to a separating unit periodically and in order, the articles are separated from the runner-strip by a shock applied to both sides of the articles. Finally, the articles which are separated from the runner-strip and the runner-strip from which the articles are detached, that is to say, the runner-strip removing the articles, are collected respectively. Since the articles are collected efficiently, automatic operation of the manufacturing reduces labor costs.

In addition to the above mentioned method, if manufacturing conditions permit, the runner-strip removing the articles is returned to a storage which stores up molten material to be injected into the molds. Therefore, the runner-strip can be melted continuously for reproduction. Moreover, if the molten material is metal, it is an advantage for reproduction that oxidation of the metal is prevented because the metal is inserted deeply into the storage for melting purposes.

An apparatus constructed in accordance with the principles of the present invention includes an injection molding unit provided with a stationary mold and a movable mold. Molten material is injected into both the stationary mold and the movable mold. A pulling-out unit is provided in which a molded piece i.e. a runner-strip and articles attached to the runner-strip is pulled out on completion of their molding in the injection molding unit with a predetermined stroke, while the back end of the runner-strip is left in the injection molding unit in order to be continued to a subsequent runner-strip while it is molded. A separating unit is provided which removes the articles from the runner-strip by giving a shock to the articles from both sides. Collecting units are provided for collecting the articles and the runner-strip. The apparatus facilitates efficient productivity due to continuous and efficient injection molding and separation of the articles.

In addition, if design conditions permit, the collecting unit for the runner-strip connected to the separating unit has a guiding member which guides the runner-strip fed from the separating unit into a storage storing the molten material to be supplied to the molding injection unit. In this case, the runner-strip is guided into the storage continuously in the form of a series. Accordingly, since the runner-strip is inserted deeply in the molten material in the storage to melt in the molten material, the oxidation of metal of the runner-strip is substantially prevented and reproduction of the metal is facilitated.

DETAILED DESCRIPTION OF THE INVENTION

Figure 1:
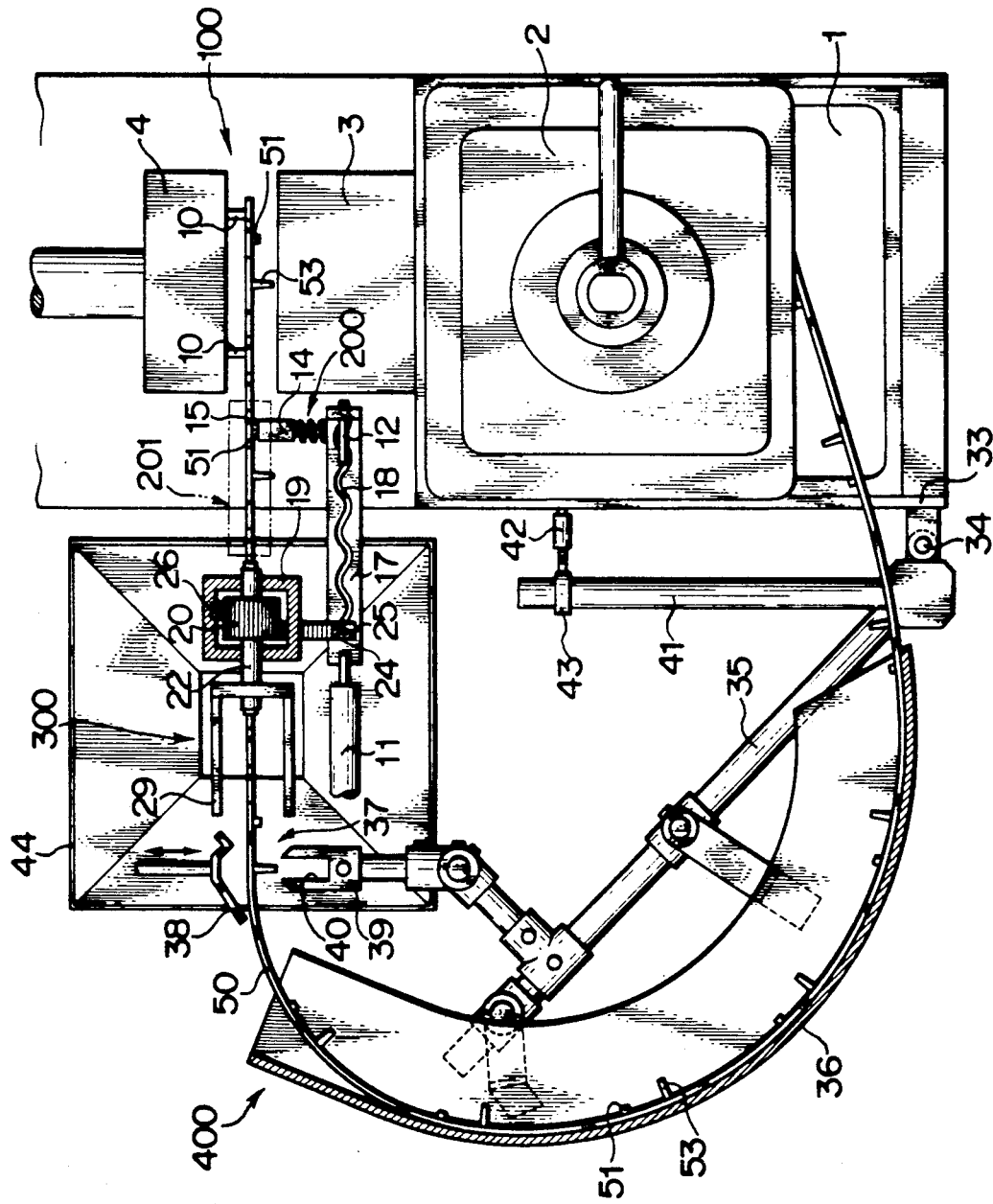
FIGS. 1 and 2 are a plan view and a front view, respectively, of an apparatus of continuous manufacturing of injection molded articles of the present invention.
Figure 2:
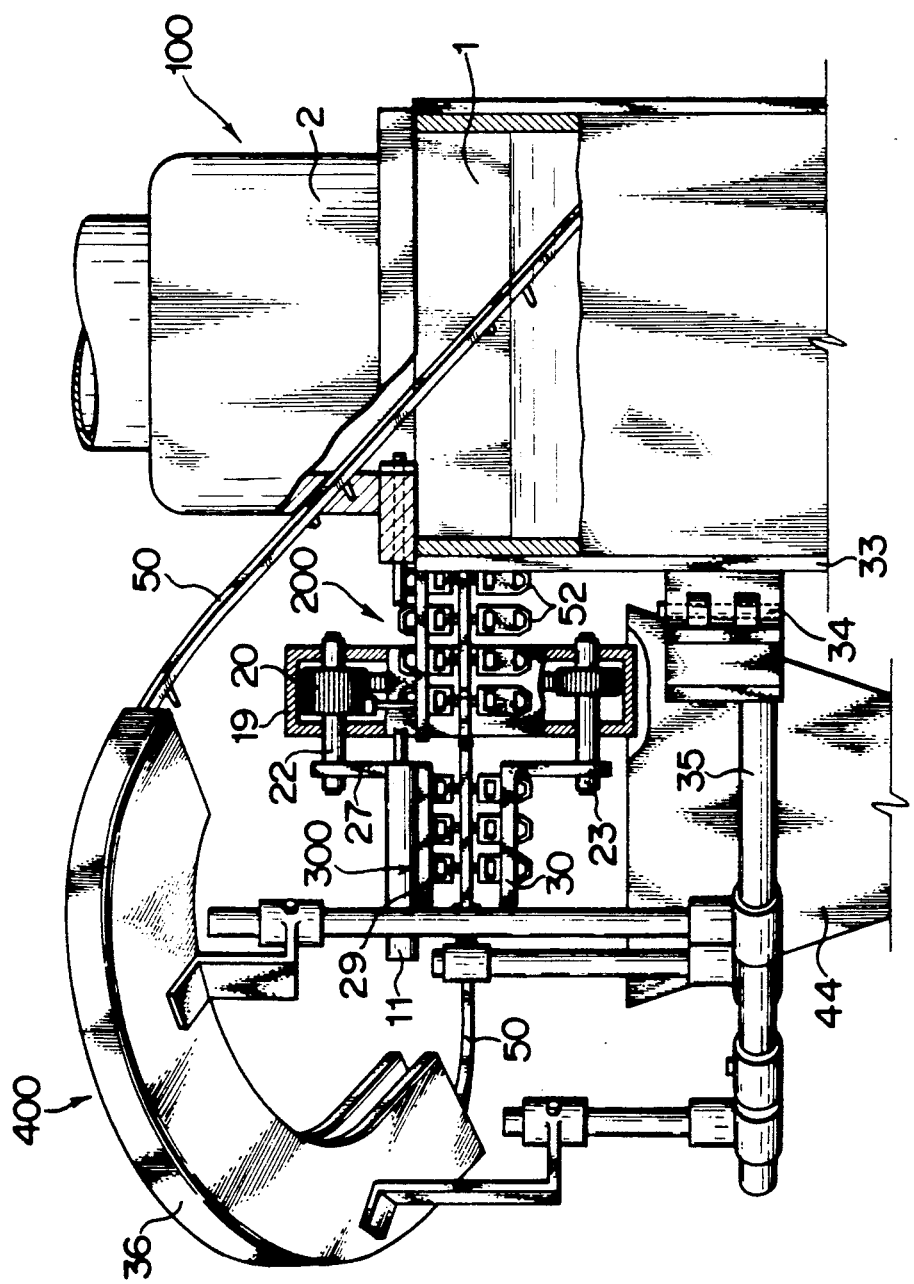

An apparatus for manufacturing injection molded articles constructed in accordance with the principles of the present invention is illustrated in FIGS. 1 and 2. The apparatus includes an injection molding unit 100 for molding a piece 50, 52 composed from a runner-strip 50 having a sprue 53, which is molded in a runner 5, and articles 52, which are molded in a cavity 6 and which are attached to the runner-strip 50. A pulling-out unit 200 is provided from continuously pulling out the molded piece 50, 52. A separating unit 300 is provided for removing the articles 52 from the runner-strip 50. Collecting units 44, 400 are provided for collecting the articles 52 and the runner-strip 50, respectively.

Figure 3:
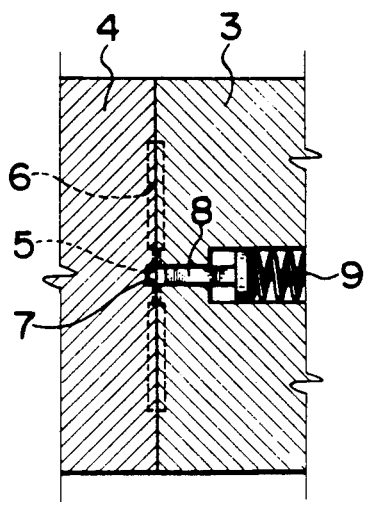
FIG. 3 is a sectional view of an outlet for articles between a movable mold and a stationary mold when they are closed.

The injection molding unit 100 has a stationary mold 3, which is connected to a storage of molten material through the intermediary of an injecting apparatus 2 for the molten material, and a movable mold 4, which faces the stationary mold 3 and which is placed so as to move back and forth toward the stationary mold 3. As shown in FIG. 3, on the inner face of the molds 3,4, the runner 5 is formed on either both sides or one side of a parting line of the molds 3,4 and the cavity 6 is formed on both sides of the runner 5. One end of the runner 5 is extended to at least one side face of the movable mold 4 and/or the stationary mold 3, adjacent to a pulling-out unit 200 to make an opening 7. During continuous manufacturing of injection molding, the opening 7 is plugged by a proceeding runner-strip 50. However, at the beginning of the manufacturing of injection molding, if the opening is not plugged, molten material overflows from the opening 7. As shown in FIG. 3, in order to prevent such overflow, the stationary mold 3 is provided with a pin 8 urged resiliently toward the opening 7 by a spring 9. At the beginning of the manufacturing process, the opening 7 is plugged by the pin 8. The stationary mold 3 forms a recess (not shown) digging vertically in relation to a parting surface in order to form a projection 51 and the sprue 53 on the runner-strip 50. When the runner-strip 50 is molded and a proceeding runner-strip 50 is fed out from molds 3,4, the back end of the proceeding runner-strip 50 plugs the opening 7 of the molds 3,4, and the projection 51 or the sprue 53 of the proceeding runner-strip 50 is located a predetermined distance from the opening 7. Either the projection 51 or the sprue 53 functions as a projection of a pulled-out and engaged. Further, as shown in FIG. 1, the movable mold 4 has a built-in pair of ejector pins 10, 10 for pushing the molded piece 50,52 out of the movable mold 4.

Figure 5:
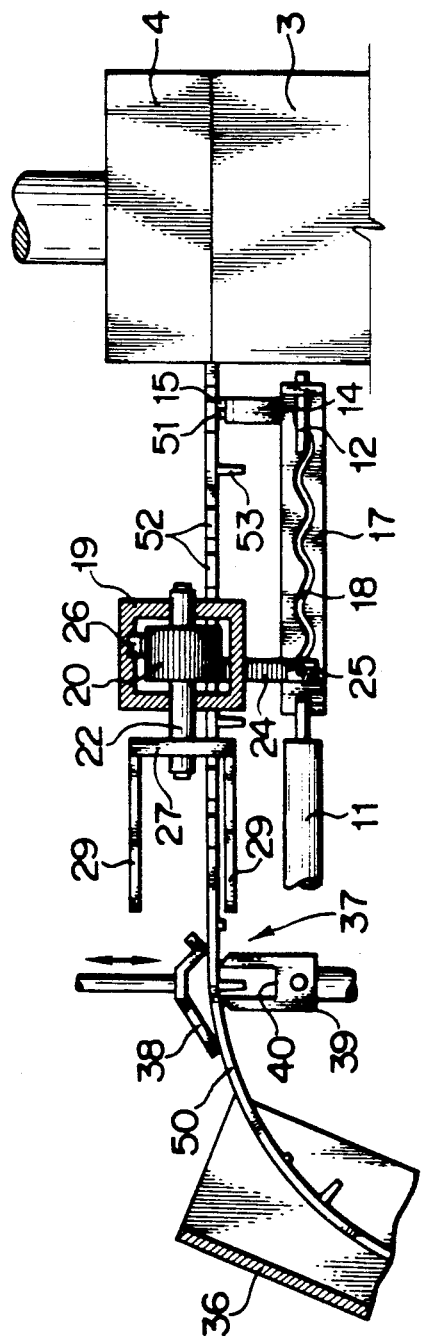
FIG. 5 is a plan view of the apparatus of the present invention when molten material is injected into molds.
Figure 6:
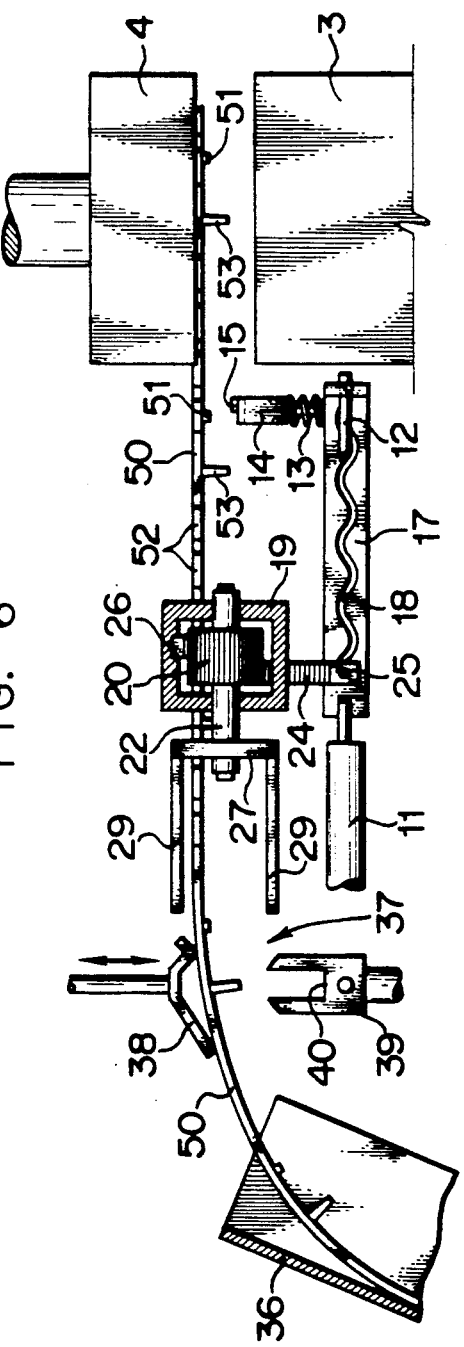
FIG. 6 is a plan view of the apparatus of the present invention when both molds are opened.

As shown in FIG. 5, the movable mold 4 is moved forward to contact the stationary mold 3 and the molten material is injected into the molds 3, 4. After the molds 3, 4 are cooled, as shown in FIG. 6, the movable mold 4 is moved backward to open the molds 3,4. In this case, the movable mold 4 is apart from the stationary mold 3 while the molded piece 50, 52 is attached to the movable mold 4. Therefore, as shown in FIG. 1, the two ejector pins 10, 10 are projected from the movable mold 4 to push the molded piece 50, 52 out so that the molded piece 50, 52 is detached from the movable mold 4.

Figure 7:
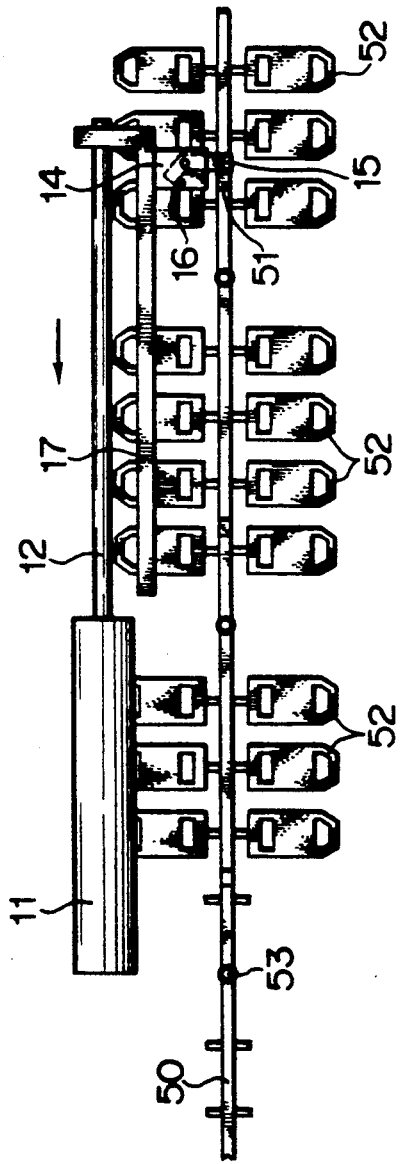
FIG. 7 is a plan view showing operation of a pulling-out unit when a molded runner-strip is fed from the molds.
Figure 8:
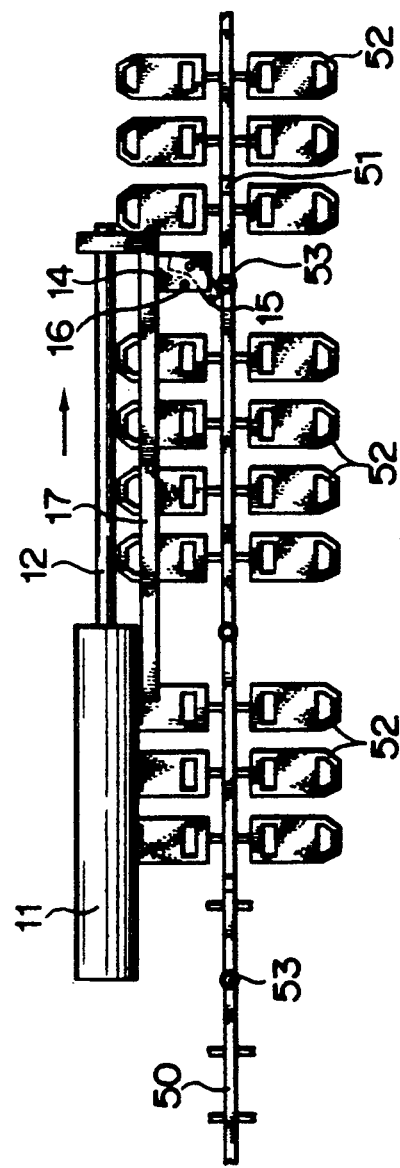
FIG. 8 is a plan view of a pulling-out unit when the unit is returned to an original position.
Figure 9:
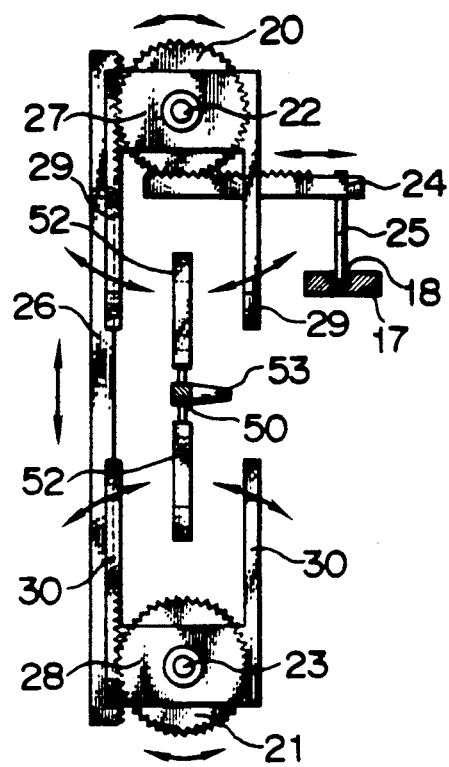
FIG. 9 is front view of a separating unit.

As shown in FIGS. 1, 7 and 8, the pulling-out unit 200 has a cylinder 11 by which the runner-strip 50 with a number of articles 52 molded in both molds 3,4 is pulled out straight from the molds 3,4. A piston rod 12 extending from the cylinder 11, fixed to a supporting frame (not shown), has a reciprocating member 14 at the end of the piston rod 12 adjacent to the molds 3, 4. The reciprocating member 14 is perpendicularly arranged with respect to the piston rod 12 by means of a sliding plate 17, which will be described herein below, to be projected horizontally towards a feeding line of the runner-strip 50, and to bend down at the end portion of the reciprocating member 14. A lever 15, in this embodiment, which is bending on its center to be a crank shape, is pivoted about its center to the downward end portion of the reciprocating member 14. Further, the reciprocating member 14 is provided with a stopper pin 16, which is arranged to be able to contact with the upper part of the lever 15, wherein the lever 15 is pivoted to a certain angle. When the upper part of the lever 15 contacts with the stopper pin 16, the lower part of the lever 15 stands substantially straight. Further, when the reciprocating member 14 is moved toward molds 3,4, even though there may be something to be contacted by the lower part of the lever 15, the upper part of the lever 15 is not contacted by the stopper pin 16. Therefore, the lever 15 is free to rotate. However, when the reciprocating member 14 is moved back, if the lower part of the lever 15 is contacted by something, the upper part of the lever 15 is contacted by the stopper pin 16 Therefore, the lever 15 is no longer free to rotate.

In order for the piece 50, 52, molded in the injection molding unit 100 to be pulled out by the pulling-out unit 200, the reciprocating member 14 is reciprocated by moving operation of the cylinder 11. In this case, a length of the stroke of the cylinder 11 permits the back end of the runner-strip 50 to be left in the opening 7 to plug the opening 7.

At the start of the molding in the injection molding unit 100, after the molds 3,4, are opened, the runner-strip 50 is pulled out by manual operation. However, after the first runner-strip 50 is pulled out all of the following runner-strips 50 are pulled out by the pulling-out unit 200. As shown in FIG. 7, when the cylinder 11 is driven backward, the lower part of the lever 15 engages the projection 51 of the runner-strip 50. Accordingly, the runner-strip 50 is pulled out by the cylinder 11. After the reciprocating member 14 is moved backward with a predetermined stroke, as shown in FIG. 8, when the cylinder 11 is driven forward, even though the lower part of the lever 15 is contacted by either the projection 51 or the sprue 53, the lever 15 is rotated over the projection 51 or the sprue 53. As shown in FIG. 6, during the injection molding, the reciprocating member 14 is pushed toward the stationary mold 3 by the runner strip 50 against a spring 13. In this case, the lever 15 engages the projection 51 of the runner-strip 50. However, as shown in FIG. 6, when the movable mold 4 is moved backward after the injection molding is completed, the runner-strip 50 is moved back together with the movable mold 4. Accordingly, the runner-strip 50 disengages from the lever 15 for a moment, and the reciprocating member 14 is projected out toward the runner-strip 50. Then, as shown in FIG. 1, when the runner-strip 50 is pushed out from the movable mold 4 by the ejector pins 10, the projection 51 of the runner-strip 50 engages with the lever 15.

The sprue 53, which is formed on the runner-strip 50 by the injection molding, might be used instead of the projection 51, which is specially formed for this purpose.

Figure 4:
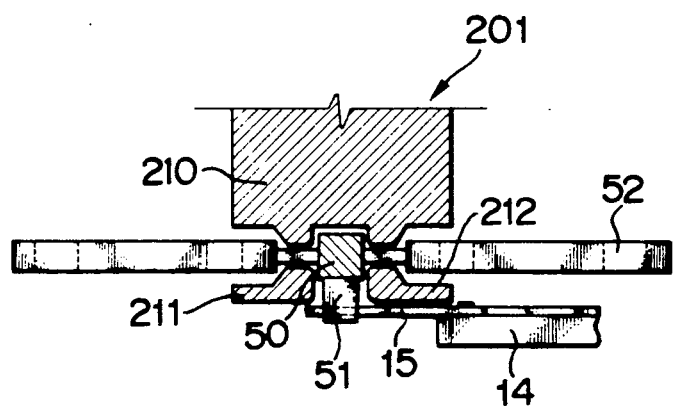
FIG. 4 is a sectional view of a supporting and guiding member for articles and a runner-strip pulled out from molds.

As shown in FIG. 4, a supporting and guiding member 201 for the pulled-out molded piece 50, 52 is placed in the pulling-out unit 200. The supporting and guiding member 201 can, for example, be placed along both sides of the runner-strip 50 as illustrated in FIG. 4, and includes back members 210 and front (projection 51-side) members 211 and 212. The three members 210, 211 and 212 are moved backward and forward toward the runner-strip 50 with movement interlocked with that of the ejector pins 10 of the movable mold 4. When the ejector pins 10 are projected out, the supporting and guiding member 201 is arranged to form a feed path for the molded piece 50, 52, the projection 51 and the sprue 53. The supporting and guiding member 201 maintains the back end of the runner-strip 50, which is pulled out from the injection molding unit 100, in a position at the opening 7 without slipping off.

In the embodiment illustrated in the figures, the lever 15, installed in the pulling-out unit 200, engages the projection 51 so that the runner-strip 50 is pulled out. However, when the sprue 53 formed on the runner-strip 50 is engaged it is unnecessary to form the projection 51 on the runner-strip 50. That is to say, the runner-strip 50 can be pulled by engaging the lever 15 with the sprue 53 of the runner-strip 50.

The composition of the separating unit 300 is described as follows with reference to FIGS. 1, 2, 5, 6, 7, 8 and 9. The sliding plate 17, which slides backward and forward on a guiding member (not shown), is placed parallel to and below the piston rod 12. The end portion of the sliding plate 17 is fixed to the end portion of the piston rod 12 adjacent to the injection molding unit 00. On the upper surface of the sliding plate 17, a cam groove 18 is formed with a zigzag line in a direction the piston rod 12 is extended. A casing 19 is laid across the feeding line of the runner-strip 50. In the casing 19, there are two gears 20, 21 in the upper and lower sides, respectively, of the feeding line. Two shafts 22, 23, to which gears 20, 21 are respectively fixed,7-are placed parallel to the feeding line and go through the casing 19. A cross-rack 24, which can move back and forth in a direction perpendicular to the feeding line of the runner-strip 50, is provided at the upper part of the casing 19 so as to interlock with the upper gear 20. A pin 25, which engages with the cam groove 18, is fixed to the front end of the cross-rack 24. A backside rack 26, which can move up and down is extended between the upper gear 20 and the lower gear 21 to interlock with the gears 20, 21. The forward end of the upper shaft 22, in relation to a direction the runner-strip 50 is fed, is projected out through the casing 19. An arm 27 is fixed to the projecting forward end of the shaft 22 at the center of the arm 27. Both ends of the arm 27 are bent vertically downward. The bottom of each downward portion of the arm 27 is further bent and extended horizontally to be parallel to the shaft 22. The downward and horizontal portions of the arm 27 form a beating member 29. The front and back portions of the beating member 29, which face each other, are placed at the front and back sides respectively, of the molded articles 52. The horizontal portions of the beating member 29 are located at substantially the same level as the center of the articles 52. An arm 28 and a beating member 30 are similarly disposed with respect to the shaft 23 of the lower gear 21, so that the upper and lower beating members 29, 30 face each other.

As a result, a separating step is carried out as follows. When the cylinder 11 is moved backward and forward along the feed line of the runner-strip 50, the pin 25, which engages with the cam groove 18 of the sliding plate 17, moves back and forth in relation to the feeding line so that the cross rack 24 is moved back and forth. Therefore, as the upper gear 20 is rotated within a limited angle clockwise and counterclockwise due to movement of the cross rack 24, the lower gear 21 is similarly rotated by means of the back-side rack 26. The rotation of the upper and lower gears 20, 21 cause beating members 29, 30 to swing about the shafts 22, 23, respectively. Accordingly, by swinging the beating members 29, 30, the articles 52, which are attached to the upper and lower sides of the runner-strip 50, are beaten from both sides causing a shock to be sent through the articles 52. As a result, the articles 52 are detached from the runner-strip 50 and fall down. The articles 52, fallen from the separating unit 300, are received by a hopper 44, and are then packed.

Figure 10:
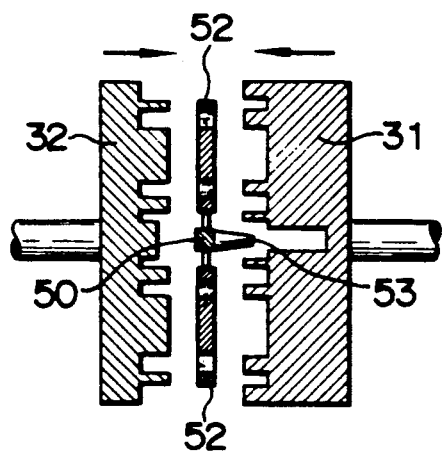
FIG. 10 is a sectional view of a modified separating unit.

Another embodiment of the separating unit 300 is shown in FIG. 10. The molded articles 52 are trimmed by removing unnecessary molded fragments which are formed together with the articles 52. Both the molded fragments and the articles 52 are detached from the runner-strip 50. The separating unit 300 is provided with a male and a female die 31, 32 having, male and female patterns made for contours of the articles 52 on the inner opposite faces of the dies 31,32. The dies 31,32 are moved off and moved in close to each other by operation of a moving means (not shown), which is different from the above mentioned operation of the cylinder 11. By the movement of the dies 31,32, the molded piece 50,52 are pushed from both sides. The unnecessary molded fragments and gates are given a shock by the pattern formed on the inner faces of the dies 31,32 so as to be detached from the articles 52 and the runner-strip 50. At the same time, the articles 52 are detached from the runner-strip 50. Then, after both dies 31,32 are opened, the unnecessary fragments are suitably removed by, for example, spraying with air, brushing with a hammer, or any other suitable means.

In the collecting unit 400 for the runner-strip 50, the runner-strip 50 fed from the separating unit 300 is returned to the storage 1 of the injection molding unit 100. If the molten material is, for example, synthetic resin, since it cannot be returned to the storage 1 directly for reproducing, the separated runner-strip 50 is kept in, for example, a stock-box for a period of time. However, if the molten material is, for example, aluminum alloy and the like, since it can be molded to be reused soon, the separated runner-strip 50 is returned to the storage 1 directly for reproducing.

As shown in FIG. 1 and 2, the collecting unit 400 includes a supporting frame 35, placed to be projected from the frame 33 which supports the storage 1 by means of a hinge 34. A guiding member 36, which is curved to be arc-shaped on its plan view and to be C-shaped on its cross section, is supported by the supporting frame 35. A pressing and curving mechanism 37, which presses and curves the runner-strip 50 fed from the separating unit 300, is placed between the guiding member 36 and the separating unit 300, so that the runner-strip 50 is introduced into the guiding member 36, and is curved without returning to its original form by the pressing and curving mechanism 37. The pressing and curving mechanism includes a pressing lever 38, which is placed on the movable mold 4 of the feeding line of the runner-strip 50, and a receiving member 39, which is fixed to the end of the supporting frame 35 and which faces the pressing lever 38. The pressing lever 38 moves back and forth in a moving direction of the movable mold 4 with movement interlocked with that of the movable mold 4. The receiving member 39 has a recess 40 for receiving the sprue 53. A control rod 41 extends from the hinge 34 of the supporting frame 35 to be parallel with the frame 33 so that the supporting frame 35 is fixed with an adjustable angle made between the supporting frame 35 and the control rod 41. A connecting member 43 is connected to the front end of the control rod 41, for example, by screws. The connecting member 43 is connected and locked removably to an adjusting member 42, which projects from the frame 33, with an adjustable distance between the connecting member 43 and the adjusting member 42.

Continuous manufacturing of injection molding articles constructed in accordance with the embodiments of the present invention is carried out as follows. The molded piece 50,52 (the runner-strip 50 and the articles 52 attaching to the runner-strip 50) is molded in the injection molding unit 100. The molded piece 50,52 is pulled out by the pulling-out unit 200, while the pulling-out unit 200 is continued to the proceeding piece 50, 52 to form a series of the pieces 50,52. During feeding of the piece 50, 52, the articles 52 are separated from the runner-strip 50 by a shock applied to the articles 52 caused from the swinging of the beating members 29, 30 provided at both sides of the articles 52. The separated articles 52 are received by the hopper 44 as a collecting for the articles 52, and are packed, for example, in a box or other suitable storage container.

When, the collecting unit 400 for the runner-strip 50 is in place, the runner-strip 50 removing the articles 52 is curved and does not return to its original form, by the pressuring lever 38 and the receive die 39, and introduced to the guiding member 36. Then, the runner-strip 50 is continuously inserted to the storage 1 through the guiding member 36. The part of the runner-strip 50, located in a shallow portion of the storage 1, does not melt. The front end of the runner-strip 50 begins to melt when the part is inserted deeply in the storage 1 for reproduction. Accordingly, if the material is metal, it melts efficiently without oxidation.

It is to be understood that the present invention is not limited to the specific embodiments thereof except as defined in the appended claims.

What is claimed is:

1. An apparatus of continuous manufacturing of injection molded articles, said apparatus having an injection molding unit which is provided with a storage for molten material and which carries out injection molding of a piece containing a continuous runner-strip to be molded in a runner and a number of said articles attached to said runner-strip, a separating unit which separates said molded piece into said runner-strip and said articles automatically and collecting units which are placed separately, said apparatus comprising:
   (a) a stationary mold and a movable mold forming said injection molding unit, said molds forming a pattern for molding a pulled-out and engaged portion of said runner-strip at a certain part of said runner, said injection molding unit having an opening formed by at least one side face of at least one of said stationary mold and said movable mold, wherein said stationary mold is provided with a pin which is urged resiliently toward said opening;
   (b) a pulling-out unit for said molded piece which has an engaging means for engaging with said pulled-out and engaged portion of said runner-strip only in one direction and which has a reciprocating member moving backward and forward with a predetermined stroke in extending direction of said runner-strip while a backward end of said runner-strip is left in said opening so that said piece is molded to a proceeding piece and a following piece;
   (c) said separating unit for said runner-strip and said articles having a shock means for giving a shock to said articles attached to said runner-strip by an operation interlocked with operation of said engaging means; and
   (d) said collecting units connected to said separating unit having collecting means so as to sort and collect said articles and said runner-strip respectively.

2. An apparatus of continuous manufacturing of injection molded articles according to claim 1, wherein the length of said predetermined stroke of said reciprocating member is the same as the length of said runner-strip.

3. An apparatus of continuous manufacturing of injection molded articles according to claim 1, wherein said shock means comprises beating members placed at opposite sides of said articles so as to beat said opposite sides of said articles.

4. An apparatus of continuous manufacturing of injection molded articles according to claim 1, wherein said shock means is placed at opposite sides of said articles and said shock means has a pair of faces facing each other with male and female patterns for pushing said articles from said opposite sides.

5. An apparatus of continuous manufacturing of injection molded articles according to claim 1, wherein said collecting means for said runner-strip includes a guiding member extending from said separating unit to a storage unit.

6. An apparatus of continuous manufacturing of injection molded articles according to claim 1, wherein said collecting means for said articles includes a hopper.

* * * * *